United States Patent
Copeland et al.

(10) Patent No.: US 7,285,225 B2
(45) Date of Patent: Oct. 23, 2007

(54) METHOD AND APPARATUS FOR CONCENTRATING A SLURRY

(75) Inventors: John W. Copeland, Piedmont, OK (US); John A. Parker, Statesboro, GA (US)

(73) Assignee: Tronox, LLC, Oklahoma City, OK (US)

( * ) Notice: Subject to any disclaimer, the term of this patent is extended or adjusted under 35 U.S.C. 154(b) by 0 days.

(21) Appl. No.: 10/590,090

(22) PCT Filed: Oct. 15, 2004

(86) PCT No.: PCT/US2004/034120

§ 371 (c)(1),
(2), (4) Date: Aug. 21, 2006

(87) PCT Pub. No.: WO2006/043936

PCT Pub. Date: Apr. 27, 2006

(65) Prior Publication Data

US 2007/0221575 A1    Sep. 27, 2007

(51) Int. Cl.
*B01D 33/03* (2006.01)
*B01D 33/00* (2006.01)
*B01D 61/00* (2006.01)

(52) U.S. Cl. .................. 210/785; 210/636; 210/649; 210/767; 210/770

(58) Field of Classification Search .................. None
See application file for complete search history.

(56) References Cited

U.S. PATENT DOCUMENTS

| | | |
|---|---|---|
| 4,199,552 A | 4/1980 | Rado |
| 4,239,548 A | 12/1980 | Barnard et al. |
| 4,405,376 A | 9/1983 | Matsunaga et al. |
| 4,427,451 A | 1/1984 | Baloga |
| 4,872,988 A | 10/1989 | Culkin |
| 4,952,317 A | 8/1990 | Culkin |
| 5,030,439 A | 7/1991 | Brownbridge |
| 5,203,916 A | 4/1993 | Green et al. |
| 5,242,557 A | 9/1993 | Jones et al. |
| 5,393,510 A | 2/1995 | Blumel et al. |
| 5,540,907 A | 7/1996 | Blumel et al. |
| 5,620,605 A | 4/1997 | Møller |
| 5,622,628 A | 4/1997 | Trendell et al. |
| 5,653,793 A | 8/1997 | Ott et al. |
| 5,730,795 A | 3/1998 | Herkimer |
| 5,730,796 A | 3/1998 | Brand et al. |
| 5,746,819 A | 5/1998 | Kostelnik et al. |
| 5,785,748 A | 7/1998 | Banford et al. |
| 6,048,505 A | 4/2000 | Miller et al. |
| 6,123,848 A | 9/2000 | Quepóns |
| 6,569,920 B1 | 5/2003 | Wen et al. |
| 6,616,746 B2 | 9/2003 | Takahashi et al. |
| 6,695,906 B2 | 2/2004 | Hiew et al. |
| 6,699,317 B1 | 3/2004 | Brownbridge et al. |

*Primary Examiner*—Krishnan S. Menon
(74) *Attorney, Agent, or Firm*—McAfee & Taft

(57) ABSTRACT

The current invention provides improved methods and filter stacks for concentrating a slurry of titanium dioxide. The improved filter stack comprises a series of filter disks and diverter trays arranged in parallel. The present invention provides an improvement over prior art filter stacks by using a substantially complete weld to attach a diverter plate to the diverter trays. The current invention also provides an improved method for pre-conditioning a filter stack. The improved method is designed to pre-condition and gradually prepare the filter stack for production of the desired slurry of titanium dioxide. Further, the current invention provides an improved process for preparing and transporting a slurry of titanium dioxide. Finally, the current invention provides a method for enhancing the lifespan of a filter stack. The method for enhancing the lifespan of the filter stack continuously monitors the flow rate and specific gravity of fluids produced from the filter stack and signals the need for flushing of the filter stack.

35 Claims, 4 Drawing Sheets

METHOD AND APPARATUS FOR CONCENTRATING A SLURRY

CROSS RELATED

This application claims the benefit of previously filed International Application PCT/US04/34120 filed Oct. 15, 2004.

BACKGROUND OF THE INVENTION

Manufacture of pigment grade titanium dioxide requires several processing steps. Generation of a raw or crude titanium dioxide pigment, via calcination in a sulfate process or oxidation in a chloride process, is an intermediate step in the pigment manufacturing process. The raw pigment is then isolated from undesirable salts and conventionally milled as a slurry with various surface treatments to yield a pigment having a desired particle size distribution. Further, certain manufacturing processes benefit from the use of a slurry of a finished titanium dioxide. However, the slurry generated during the manufacturing process contains an excess of water leading to increased shipping costs. Therefore, methods for dewatering titanium dioxide slurries have been developed.

One currently available system for dewatering slurries is the VSEP Filtration System available from New Logic Research Inc. (V◇SEPis a registered trademark of New Logic Research, Inc.). The VSEP process utilizes a filtration system (the "VSEP filtration system") containing a filter stack consisting of a series of disks or trays and diverters. Each filter disk has outer membranes with pore sizes generally no larger than 0.1µ and normally a drain cloth positioned between the outer membranes and the disk. The diverters determine the flow pattern through the filter stack. A typical VSEP filtration system is schematically depicted in FIG. 1 and a typical filter stack is depicted in FIG. 2. VSEP filtration systems are explained in greater detail, for example, in U.S. Pat. Nos. 4,872,988 and 4,952,317, incorporated herein by reference.

The VSEP filtration system concentrates the slurry of titanium dioxide by removing water from the slurry as it passes over the filter disks and diverters. As the specific gravity of the slurry of titanium dioxide increases, particle build up on the filter disks and diverters will occur unless the shear rate at the membrane surface is sufficient to remove the particles. To generate the necessary shear rate, the VSEP filtration system typically oscillates the trays at an amplitude of movement of about 1.9 cm (0.75 inches). This oscillation produces a shear rate at the membrane-liquid interface of about 150,000 inverse seconds. The VSEP system produces a clear water stream, referred to as permeate, and a slurry of titanium dioxide, referred to as a concentrate.

When performing within the manufacturer's specification, a standard high solids VSEP filter stack lasts between 1 and 45 days and has an average life span of 18 days. However, if operated without tray oscillation, the VSEP filter stack has a life span of only one to two hours. When compared to other filtration systems, such as cross-flow filtration, the VSEP filtration system provides superior performance. However, it would be desirable to increase the useful life span of the filter stacks used in the system and to reduce overall failures of the filter stack.

SUMMARY OF THE INVENTION

In one aspect, the current invention provides an improved method for dewatering a slurry of titanium dioxide. The slurry of titanium dioxide to be dewatered has a specific gravity of from about 1.01 to about 1.8. The filtration system used in the dewatering process comprises a filter stack including filter disks and diverter trays, a means for oscillating the filter stack, a feed tank holding the slurry of titanium dioxide to be dewatered, a permeate removal line and permeate holding tank, a concentrate removal line and concentrate holding tank and a water source. In the method of the current invention, the specific gravity of the slurry held in the feed tank is lowered by removing fluid from the feed tank and replacing the fluid with water or permeate fluid. Prior to filtering the $TiO_2$ slurry, the filter stack is pre-conditioned by directing permeate fluid from the permeate holding tank through the filter stack for a period of time sufficient to wet the filter disks and diverter trays. Following this initial treatment, feed is initiated from the feed tank to the filter stack. As the slurry feed flows from the feed tank to the filter stack, concentrate fluid removed from the filter stack is directed to the feed tank. Additionally, slurry obtained from the titanium dioxide manufacturing process is directed to the feed tank. As material continues flowing from the feed tank to the filter stack, fluid pressure entering the filter stack is adjusted to a pressure between about 275 kPa (40 psig) and about 830 kPa (120 psig). Filter stack oscillation is initiated with the flow of permeate fluid. Following an initial period of oscillation, the oscillation amplitude is increased. The oscillation amplitude for the filter stack is set between about 0.6 cm (0.25 inches) and about 3.8 cm (1.5 inches). Afterwards, the specific gravity of the slurry in the feed tank is allowed to increase to a value equal to the feed obtained from the titanium dioxide manufacturing process that is to be dewatered. As feed enters the filter stack from the feed tank, concentrate and permeate fluids are continuously removed from the filter stack.

In another embodiment, the current invention provides a method for dewatering a slurry of titanium dioxide using a VSEP filtration system. The VSEP filtration system comprises a filter stack, a motor and a concentrate fluid line. The method of the current invention increases the useful life of the filter stack. According to this method, sensors monitor concentrate flow rate, concentrate fluid pressure, and concentrate specific gravity in the concentrate fluid line. Additionally, the method of the current invention monitors the load on the motor used to oscillate the filter stack. Variations in data reported by the sensors will indicate a blocked filter stack. Specifically, the method monitors the flow rate and specific gravity of the concentrate liquid exiting the filter stack, to maintain a concentrate specific gravity of up to about 2.3 when processing the anatase form of titanium dioxide and up to about 2.2 when processing the rutile form. Additionally, the load experienced by the motor used to oscillate the filter stack is monitored for loads greater than normal. Preferably, the motor used to oscillate the filter stack is an electric motor. On initial operation of the motor a baseline amperage load is established. Amperage loads in excess of the 1.5 times this baseline are considered to be a greater than normal load. Preferably, the baseline amperage load is established on a monthly basis during operation of the VSEP system. If an out of range concentrate flow rate, concentrate fluid pressure, concentrate specific gravity or motor load is detected, then the flow of the slurry to the filter stack is stopped. Subsequently, the filter stack is flushed until the specific gravity of the concentrate exiting the filter stack has been reduced to a range of about 1.0 to about 1.2.

Following reduction in the specific gravity, slurry flow from the feed tank to the filter stack is restored with continual monitoring of the concentrate flow rate and specific gravity of the fluid exiting the filter stack. As an optional step, the current invention provides for removal of the filter stack from the VSEP filtration system and conversion of a portion of the diverter trays within said filter stack to filter disks by drilling out the diverter plates welded to the diverter trays.

In yet another embodiment, the current invention provides an improved filter stack for dewatering a slurry of titanium dioxide. The improved filter stack comprises at least two filter disks and at least one diverter tray arranged in parallel one above the other. Each filter disk comprises a filter membrane support having at least two slurry feed ports located a distance from the center of the membrane support. Additionally, each disk comprises at least one layer of filter membrane and a central permeate passageway. Each diverter tray comprises a filter membrane support having at least two slurry feed ports located a distance from the center of the membrane support. Additionally, each diverter tray comprises at least one layer of filter membrane and a central permeate passageway. The improvement provided by the current invention comprises a diverter plate welded over one of the two ports on the diverter tray. The diverter plate substantially blocks fluid flow through the port. More particularly, the improvement comprises a substantially complete weld around the circumference of the diverter plate. As will be described more fully herein, the use of a substantially complete weld enhances the life of the filter stack by lowering the failure rate of the diverter plates.

The current invention also provides a method for preparing and transporting a slurry of titanium dioxide. The method utilizes a slurry of titanium dioxide having a specific gravity between about 1.1 and about 1.8. The slurry is dewatered to yield a concentrate having a specific gravity of about 2.0 to about 2.3 and a permeate having a specific gravity between about 1.0 and about 1.1. The permeate is passed to a permeate holding tank and the concentrate is passed to a concentrate holding tank. Concentrate is subsequently transferred from the concentrate holding tank to a suitable transportation tank and transported to a finishing plant.

DETAILED DESCRIPTION OF THE PREFERRED EMBODIMENTS OF THE INVENTION

1. An Improved Filter Stack for a VSEP Filtration System

Figure 1:
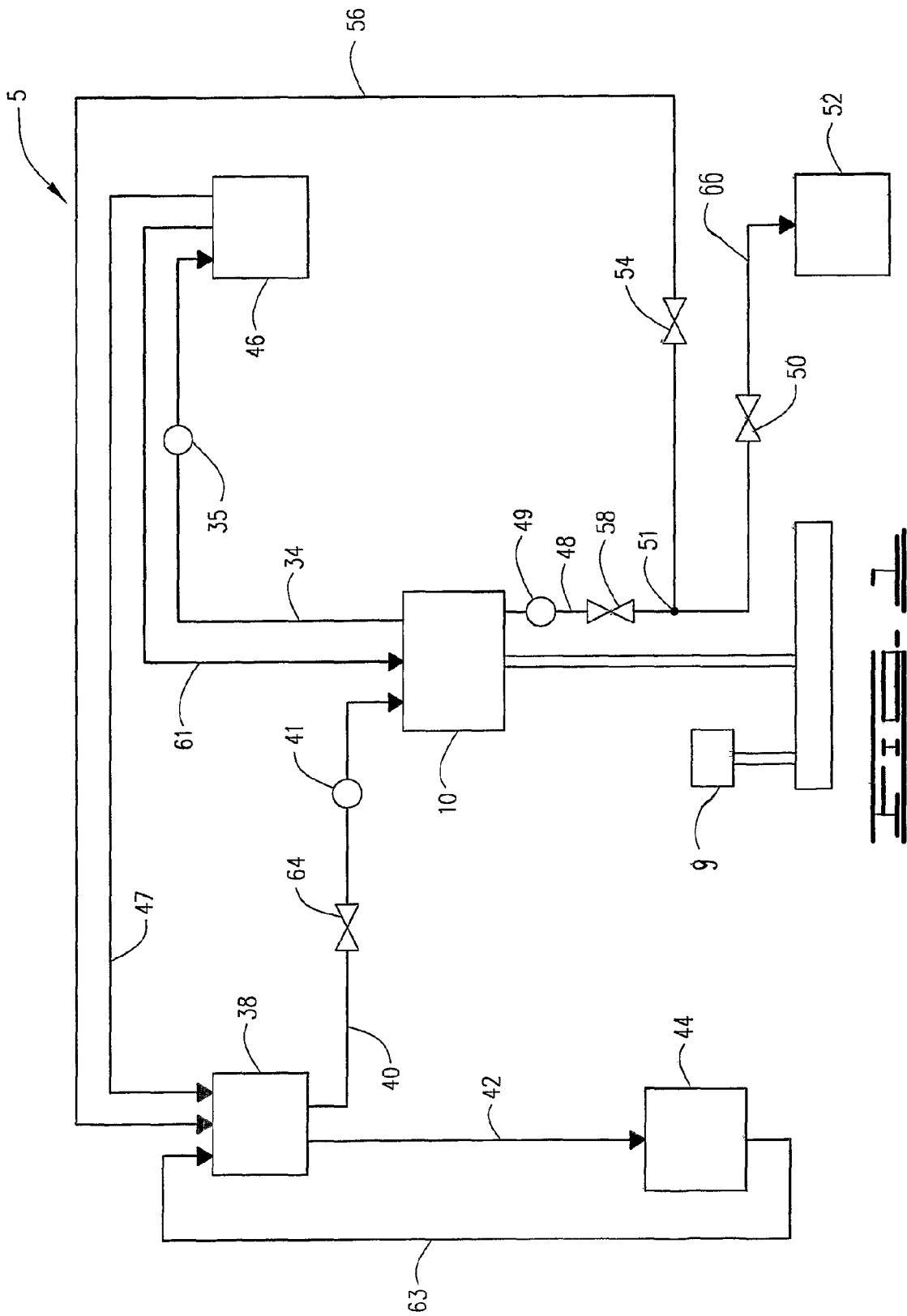
FIG. 1 is a schematic depiction of a VSEP system.
Figure 2:
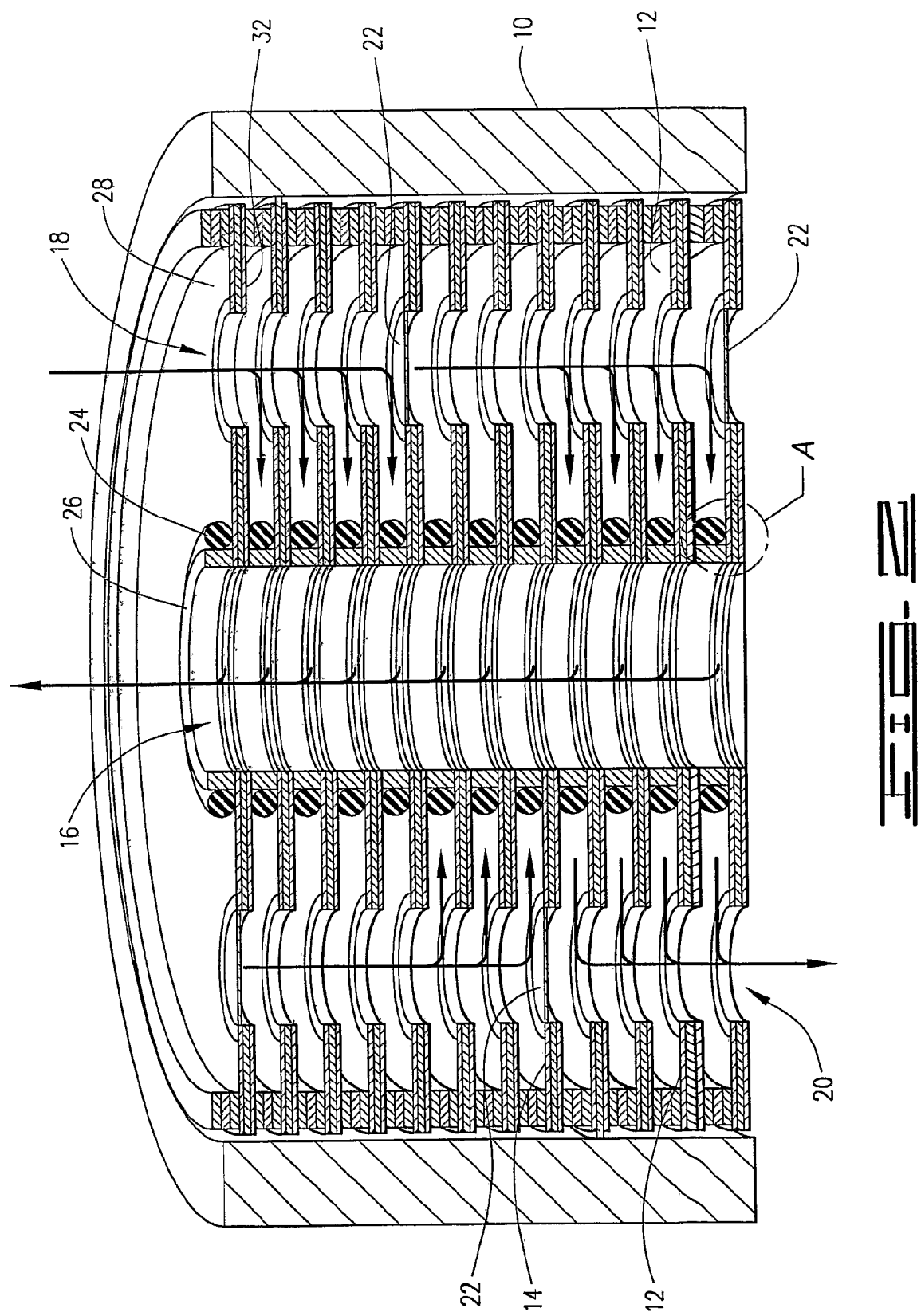
FIG. 2 is a perspective view of a VSEP filter stack.

FIG. 1 depicts the typical components of a VSEP filtration system 5. As depicted in FIG. 1, filtration system 5 comprises a filter stack 10, slurry feed tank 38, a slurry holding tank 44, concentrate holding tank 52 and a permeate holding tank 46. Slurry feed tank 38 is typically in fluid communication with a titanium dioxide manufacturing process, not shown. A slurry of titanium dioxide is received from the manufacturing process through conduits (not shown). The slurry generally has a specific gravity of about 1.4 to about 1.53; however, the specific gravity may range from 1.01 to about 1.8. Filter stack 10 contains a series of filter disks 12 and diverter trays 14 as depicted in FIG. 2. Also depicted is a motor 9 coupled to a variable frequency drive (not shown). Motor 9 is preferably an electric motor. Motor 9 is joined to filter stack 10 in a manner suitable to impart an oscillating movement to filter stack 10.

As shown in FIG. 2, filter disks 12 and diverter trays 14 are arranged in parallel, one above the other. A typical thirty-six inch tall filter stack 10 may have from one hundred to about one hundred fifty filter disks 12 with about ten to about thirty diverter trays 14 interspersed among the filter disks 12. The actual arrangement of filter disks 12 and diverter trays 14 can be tailored to the specific operation. Normally, the frequency of diverter trays 14 increases near the bottom of filter stack 10. For example, a common arrangement of filter disks 12 and diverter trays 14 is (from top to bottom) 11/7/7/6/6/4/4/4/4/4/4/4/4/4/4/2/2/2/2, where each number represents the number of filter disks 12 grouped above a diverter tray 14 and each slash represents a diverter tray 14. Thus, in the specified arrangement, a diverter tray 14 is positioned in parallel between a grouping of eleven filter disks 12 above and seven filter disks 12 below, which grouping of seven is separated from another, lower group of seven filter disks 12 by a diverter tray 14, and so forth.

The increased frequency of diverter trays 14, near the bottom of filter stack 10, ensures adequate fluid flow rates across diverter trays 14 to preclude dilatancy of the concentrated slurry. VSEP filtration system 5 removes water from the slurry as the slurry passes over each diverter tray 14 and filter disk 12. Thus, as the slurry approaches the bottom of filter stack 10, the specific gravity has increased leading to an increase in slurry viscosity. If the slurry is over concentrated, the shearing effect of the oscillating filter stack can cause the slurry to gel and go dilatant. To reduce the likelihood of dilatancy, filter stack 10 utilizes a greater frequency of diverter trays 14 near the bottom to produce more frequent changes in slurry direction. The frequent changes in slurry direction across filter disks 12 increases slurry flow rate across filter disks 12. The increased slurry flow rate reduces the degree of dewatering experienced by the slurry in the lower portion of filter stack 10 and reduces the likelihood of the slurry going dilatant.

Figure 4:
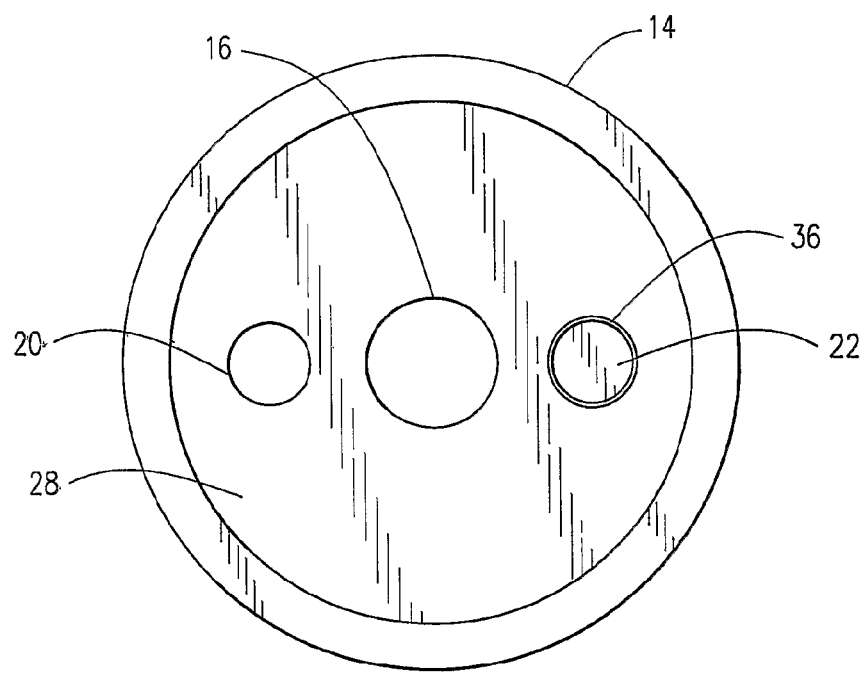
FIG. 4 is a top view of a diverter tray depicting the welded diverter plate.
Figure 5:
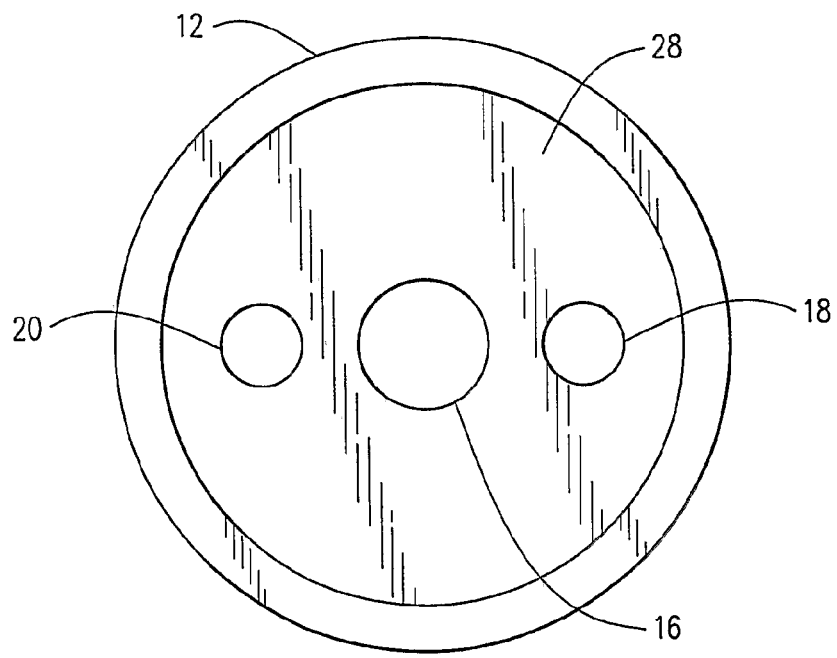
FIG. 5 is a top view of a filter disk.

As shown in FIG. 5, each filter disk 12 has three fluid flow passageways 16, 18 and 20, while each diverter tray 14, depicted in FIG. 4, has only two fluid flow passageways 16 and 20. The common central passageway 16, also referred to herein as permeate port 16, provides for removal of clear permeate from filter stack 10. Referring to FIGS. 1 and 2, permeate port 16 is in fluid communication with line 34. Line 34 carries permeate from filter stack 10 to permeate holding tank 46. Line 34 preferably includes a sensor 35 suitable for monitoring fluid flow rate and pressure. Fluid flow passageway 20 is also known as concentrate port 20. Concentrate port 20 provides fluid communication through filter stack 10 and is in fluid communication with concentrate holding tank 52 via lines 48 and 66.

On filter disk 12, passageway 18 is also known as feed port 18. Slurry feed from feed tank 38 passes through line 40, valve 64 and enters filter stack 10. Line 40 preferably includes a sensor 41 suitable for monitoring fluid pressure and flow rates in line 40. Preferably, sensor 41 relays information on fluid flow rate and pressure to a computer system not shown. Line 40 is in fluid communication with feed port 18 of each filter disk 12. Diverter tray 14 differs from filter disk 12 in that diverter tray 14 has a diverter plate 22 welded over feed port 18.

During operation of VSEP filtration system 5, slurry passes through filter stack 10 in the following manner. Slurry feed passes through feed ports 18, across filter disks 12 and diverter trays 14 and through concentrate ports 20. As shown in FIG. 2, lateral directional flow is provided by diverter trays 14. Final concentrate port 20 is in fluid communication with line 48. Line 48 includes sensor 49 and variable flow control valve 58. Sensor 49 is suitable for monitoring fluid flow rate, specific gravity and pressure. Valve 58 controls the flow of concentrated slurry (referred to herein as concentrate) out of filter stack 10 based on the specific gravity reported by sensor 49. Line 48 subsequently connects by a t-fitting 51 or other suitable device to lines 56 and 66. Lines 56 and 66 include open/shut valves 54 and 50 respectively.

Valves 50 and 54 are controlled by the computer system in response to data received from sensor 49. If sensor 49 detects a specific gravity lower than desired, then valve 54 will open and valve 50 will close thereby directing the slurry back to slurry feed tank 38 through line 56 for further dewatering. When the slurry exiting filter stack 10 has the desired specific gravity, data from sensor 49 signals the opening of valve 50 and closing of valve 54. In this configuration, slurry passes through valve 50 and line 66 into holding tank 52. Thus, operation of valves 50 and 54 control the flow of concentrate either to concentrate holding tank 52 or slurry feed tank 38.

As discussed above, the slurry is dewatered as it passes through filter stack 10. As the specific gravity of the slurry increases, fluid flow rate across filter disks 12 must increase. Diverter trays 14 maintain the desired fluid flow rate by forcing directional changes in fluid flow through filter stack 10. As depicted in FIG. 2, a diverter tray 14 is located at predetermined intervals. As the slurry passes through filter stack 10, the slurry encounters diverter plate 22. Diverter plate 22 establishes the crossway directional flow of the slurry across filter disks 12. More frequent changes in directional flow will result in higher flow rates across filter disks 12.

Figure 3:
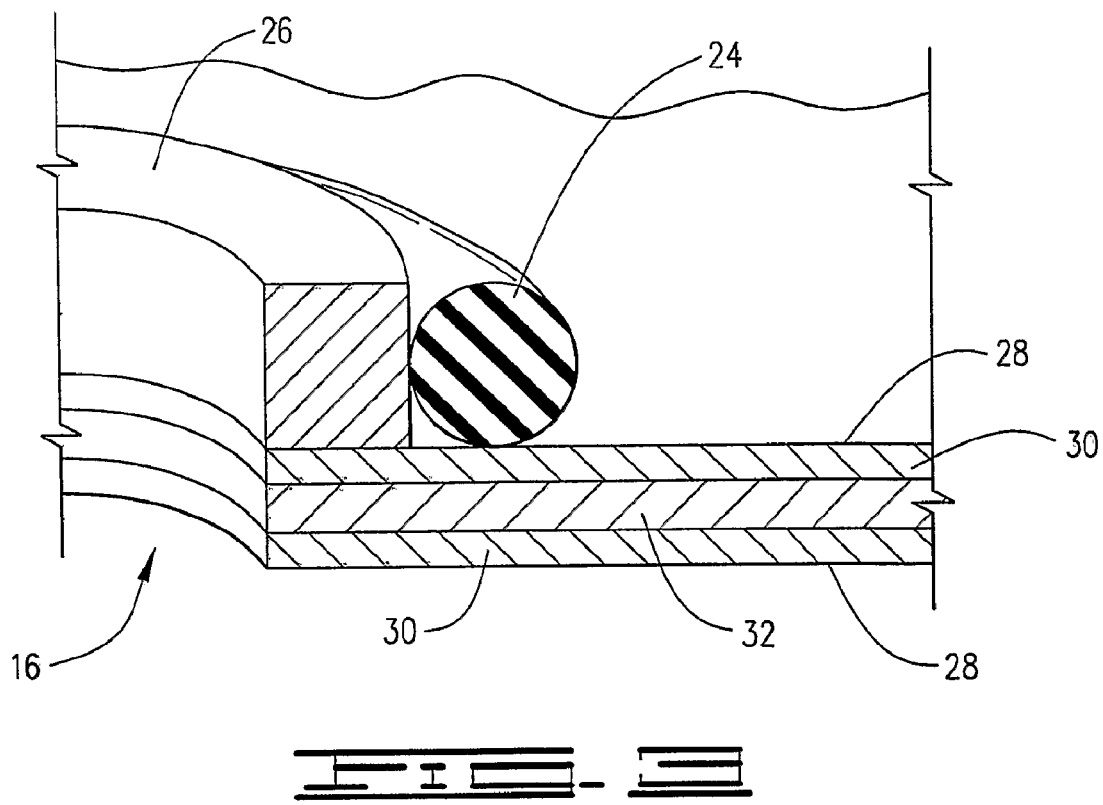
FIG. 3 is an enlarged view of a filter disk from the VSEP filter stack.

The precise arrangement of filter disks 12 and diverter trays 14 will be determined by the nature of the fluid to be processed. Further, the construction of the filter stack is well known to those skilled in the art. Therefore, only a brief description of filter stack 10 will be provided herein with reference to FIGS. 2 and 3. FIG. 3 is a detailed view of area A outlined on FIG. 2. As shown in FIG. 2, filter stack 10 is assembled as several layers of filter disks 12 with intervening diverter trays 14. Typically, o-rings 24 separate filter disks 12 and diverter trays 14 from one another. As best shown in FIG. 3, O-rings 24 are maintained in place by an o-ring retainer 26. Additionally, as shown in FIG. 3, each diverter tray 14 and filter disk 12 has a layer of membrane 28 over an optional layer of drain cloth 30 supported by a stainless steel filter membrane support 32. In the preferred embodiment, each side of stainless steel filter membrane support 32 carries drain cloth 30 and membrane 28. Membrane 28 provides the filtration means for separating the permeate from the suspended particles within a slurry stream. Failure of membrane 28 typically results in loss of product to permeate line 34 and blockage of concentrate flow from filter stack 10 to concentrate ports 20 and feed ports 18 lower in filter stack 10. Drain cloth 30 provides a fluid path for water removed from the slurry to permeate port 16. Drain cloth 30 operates both as a wick carrying water that has passed through membrane 28 to permeate port 18 and provides a degree of depth between membrane 28 and filter membrane support 32.

One common cause of membrane failure is the failure of the diverter plate 22 carried by each diverter tray 14. Currently available filter stacks 10 utilize three tack welds to join diverter plate 22 to diverter tray 14. When the slurry to be concentrated is a titanium dioxide slurry, the abrasive titanium dioxide particles contact and erode the spot welds during the filtration process until diverter plate 22 breaks away from diverter tray 14. The erosion process is enhanced by the oscillation of the filter stack 10 at an amplitude of about 0.6 cm (0.25 inches) to about 3.8 cm (1.5 inches) during the dewatering process. The rapid oscillating motion of filter stack 10 coupled with the abrasive nature of titanium dioxide frequently results in the failure of the diverter plate tack welds. Following failure of the tack welds, the free diverter plate 22 subsequently moves across membrane 28, ripping and tearing membrane 28. Blockage of the concentrate ports 20 or line 48 results, either due to membrane material build up or lodging of diverter plate 22 in either concentrate port 20 or line 48. As diverter plates 22 and material from membrane 28 and drain cloth 30 accumulate in concentrate line 48, back pressure in the filtration system will increase eventually leading to failure of filter stack 10. During commercial scale dewatering of titanium dioxide slurries, diverter plate failures are not uncommon. The abrasive nature of the titanium dioxide is believed to be a leading cause of tack weld failure.

The loss of diverter plate 22 also increases the probability of the slurry going dilatant. As noted above, loss of a diverter plate changes the internal configuration of filter stack 10. The loss of a single diverter plate 22 reduces the number of fluid flow directional changes in filter stack 10 by two. With the reduced fluid flow directional changes, fluid flow from above damaged diverter tray 14 combines with flow across filter disks 12 below damaged diverter tray 14, leading to a lower flow rate across the filter disks 12 as a whole and often to no flow across several filter disks 12. While one method of the current invention intentionally removes selected diverter plates 22 to restore pressure and flow rate to normal operating conditions, the premature loss of a diverter plate will significantly reduce the production of the VSEP filtration system 5.

In order to overcome the problems of the prior art filter stacks, the current invention provides a filter stack 10 in which each diverter tray 14 has a fully welded diverter plate 22. In this instance, diverter plate 22 is not tack welded at discrete locations to diverter tray 14; rather, as shown in FIG. 4, weld 36 is essentially continuous around the circumference of diverter plate 22. Preferably, weld 36 is a continuous gap free weld 36 around the circumference of diverter plate 22. A preferred type of weld is a continuous bead TIG weld around the circumference of diverter plate 22. Filter stacks 10 using fully welded diverter plates 22 have realized significantly improved life spans. In particular, filter stacks 10 with fully welded diverter plates 22 have seen life spans of six months and greater, in contrast to average life spans of about 18 days.

2. Slurry De-Watering Method and Method for Pre-Conditioning a VSEP Filter Stack Those skilled in the art are familiar with the construction and physical components of VSEP filtration system 5. Accordingly, the associated pumps, valves, heaters and other fluid control devices, as well as their physical arrangement within a VSEP filtration system, will not be discussed in detail herein. Rather, the following portion of this disclosure will focus on the current invention's method for pre-conditioning filter stack 10. While suitable for use with any VSEP system, the method of the current invention will be described using the depictions of the improved filter stack 10 of the current invention.

The pre-conditioning method of the current invention focuses on the initial start-up of VSEP filtration system 5. This method can best be understood by reference to FIG. 1. Under normal manufacturing conditions, the slurry of titanium dioxide within feed tank 38 has a specific gravity of about 1.4 to about 1.53; however, the slurry specific gravity may range from about 1.2 to about 1.8. Initial operation of a new filter stack 10 with a slurry having a specific gravity greater than 1.2 will cause premature failure of filter stack 10. New filter stack 11 rapidly dewaters the slurry producing an excessive build up of filter cake and increasing the likelihood of the slurry going dilatant. To overcome the problems associated with the initial start-up of VSEP filtration system 5, the current invention provides a filter stack pre-conditioning method designed to improve the life span of filter stack 10.

The pre-conditioning process initially lowers the specific gravity of the slurry housed within feed tank 38 by draining fluid from feed tank 38 through line 42 to holding tank 44. In one embodiment, feed tank 38 is drained sufficiently to permit lowering of slurry specific gravity to a range of about 1.0 to about 1.1 by dilution with water or permeate fluid. In a preferred embodiment of the current invention, approximately 90% to about 95% of the slurry in tank 38 is removed. Subsequently, water from any appropriate source is added to feed tank 38 to reduce the specific gravity to a range of about 1.0 to about 1.1. The preferred water source for lowering the specific gravity of fluid in feed tank 38 is permeate holding tank 46. Permeate from permeate holding tank 46 passes through line 47 to feed tank 38. As water or permeate is added to feed tank 38, the pH of the fluid should be maintained in the range of 8 to about 10.5 with a preferred target of about 9.2. Additionally, fluid temperature within feed tank 38 should be maintained between about 40° C. and about 70° C.

During the adjustment of the specific gravity within feed tank 38, fluid is preferably circulated from permeate holding tank 46 to filter stack 10 through line 61. Permeate fluid obtained from permeate holding tank 46 is preferably solids-free, i.e., the specific gravity of the fluid is between 1.0 and about 1.01. Permeate fluid passes through filter stack 10 for a period of time ranging from about 20 minutes to about 16 hours. In general, the preferred time for flowing permeate fluid through filter stack 10 is from about 1 to 2 hours. The 1 to 2 hour period corresponds to the typical amount of time required to adjust the specific gravity of the fluid within feed tank 38.

Following adjustment of the specific gravity of the fluid within feed tank 38, fluid flow from feed tank 38 to filter stack 10 is initiated and permeate flow stopped. As fluid flows from feed tank 38 into filter stack 10, fluid exiting filter stack 10 through concentrate out passage 20 passes through line 56 to feed tank 38. Permeate fluid from filter stack 10 passes through line 34 to permeate holding tank 46. Recycling concentrate from filter stack 10 to feed tank 38 via line 56 permits the gradual increase of specific gravity within feed tank 38. Additionally, to compensate for fluid loss resulting from the removal of permeate, slurry from the titanium dioxide manufacturing process (not shown) having a specific gravity of about 1.2 to about 1.8, more commonly 1.4 to about 1.53, is added to feed tank 38 through lines (not shown) joining VSEP filtration system 5 to the manufacturing process. Further, the slurry initially removed from feed tank 38 and stored in holding tank 44 can be returned to feed tank 38 through line 63 at this time.

To extend the life of the bearing and minimize forces on a new filter stack 10, the initial oscillation amplitude of filter stack 10 is set between about 0.32 cm (0.125 inches) and about 1.3 cm (0.5 inches) for a time period ranging from about 30 to about 120 minutes. Preferably, filter stack 10 oscillates at about 0.6 cm (0.25 inches). After an initial run in time to lubricate and warm the bearings, the oscillation amplitude is preferably maintained between about 0.6 cm (0.25 inches) and about 1.3 cm (0.5 inches) for a period of about four hours while observing the specific gravity of the slurry exiting filter stack 10.

The oscillation amplitude of filter stack 10 is maintained by varying the speed of motor 9 in response to input from the variable frequency drive (VFD). The VFD monitors and compares the volts, amps or frequency of motor 9 to a set value. The comparison determines the current amplitude of filter stack 10. The speed of motor 9 is increased or decreased as needed to maintain or alter filter stack amplitude as desired.

During the pre-conditioning stage, fluid from feed tank 38 typically enters filter stack 10 at a pressure between about 275 kPa (40 psig) and about 830 kPa (120 psig). The preferred fluid pressure entering the filter stack 10 is about 483 kPa (70 psig). Permeate pressure exiting filter stack 10 is typically between about 34 kPa (5 psig) and about 172 kPa (25 psig), with a preferred range being from about 83 kPa (12 psig) to about 110 kPa (16 psig) at startup. During the pre-conditioning phase, the concentrate pressure should approximate feed pressure and the permeate pressure should be higher than normal operating conditions. In general, the permeate pressure will be about 124 kPa (18 psig). As filter stack 10 reaches operating conditions, concentrate pressure will remain near feed pressure value and permeate pressure will decrease to a preferred range of about 41 kPa (6 psig) to about 69 kPa (10 psig). In the preferred embodiment, the initial flow rate out of concentrate port 20 is approximately 20% of the feed rate into filter stack 10.

During pre-conditioning and normal operations, the concentrate pressure will be greater than the permeate pressure. The difference in fluid pressures is referred to as the trans-membrane pressure (TMP). Thus, TMP is calculated by subtracting the permeate pressure from the concentrate pressure. The TMP measured across each filter disk 12 and diverter tray 14 should be sufficient to maintain membrane 28 and drainage cloth 30 in contact with filter membrane support 32. A TMP of less than 207 kPa (30 psig) will allow membrane 28 and drainage cloth 30 to lift away from filter membrane support 32. The slack in membrane 28 may ultimately lead to failure of membrane 28. Accordingly, the minimum TMP is about 207 kPa (30 psig). Preferably, the TMP will be 241 kPa (35 psig) or greater. In order to maintain the necessary feed, permeate and concentrate pressures, the current invention provides for constant monitoring of fluid pressure within lines 34, 40 and 48 by means of sensors 35, 41 and 49.

During the pre-conditioning phase, the specific gravity of the fluid in feed tank 38 is monitored to ensure a gradual increase in specific gravity of the fluid entering filter stack 10 from about 1.05 to about 1.5. Preferably, the specific gravity of the slurry increases at a rate of about 0.10 per hour. Other parameters monitored during initial start up include filter oscillation amplitude, feed tank pH and temperature, and flow rates and pressures of the feed, permeate and concentrate streams.

The pre-conditioning process fills any inconsistencies in the new membrane 28 and drain cloth 30 by exposing the system to low levels of $TiO_2$ and applies sufficient trans-membrane pressure to preclude lifting of membrane 28 during oscillation of filter stack 10. Pre-conditioning of filter stack 10 is considered to be complete once the specific gravity of the fluid entering filter stack 10 has reached a range of about 1.3 to about 1.4 and the permeate pressure has dropped below about 69 kPa (10 psig). Once filter stack 10 is ready to begin dewatering operations, control of VSEP filtration system 5 is normally transferred to the computer system, not shown. The computer system controls the operation of VSEP filtration system 5 on the basis of data received from various sensors including input data from at least sensors 35, 41 and 49. Preferably, the computer controlled system maintains the specific gravity of the produced concentrate in the range of about 2.0 to about 2.3, with a preferred target of about 2.18.

Following pre-conditioning, the dewatering method uses an oscillation amplitude of about 0.6 cm to about 3.8 cm (about 0.25 inches to about 1.5 inches) with a preferred amplitude range of about 1.9 cm to about 2.2 cm (about 0.75 inches to about 0.875 inches). The permeate pressure may be as high as 124 kPa (18 psi) and the concentrate pressure as high as 827 kPa (120 psi). However, more preferably, the permeate pressure will be between about 34 kPa (5 psig) and 69 kPa (10 psig) and the concentrate pressure will be between about 276 kPa (40 psig) and 414 kPa (60 psig). Additionally, the pH of the fluid entering the filter stack 10 should be between about 8.5 and 10.5, with a preferred target of about 9.2. Operating the system with a pH outside of this range typically increases the viscosity of the slurry and potentially leads to fouling of the filter. Finally, the feed tank temperature of the fluid entering filter stack 10 should be maintained between about 40° C. and about 70° C., with a target of about 62° C. Operating the system at temperatures outside of this range will cause the viscosity of the slurry to increase potentially clogging filter stack 10.

Use of the above-described method for conditioning filter stack 10 and dewatering a slurry will significantly extend the life of filter stack 10.

3. Method for Monitoring and Maintaining the VSEP Filtration System.

The current invention also provides an improved process for operating VSEP filtration system 5. Although compatible with prior art filter stacks used in VSEP filtration system 5, the method of the current invention will be described with reference to improved filter stack 10 of the current invention. The improved method for monitoring and maintaining VSEP filtration system 5 will significantly extend the life of filter stack 10. The improved process relies on operational data such as fluid flow rate, fluid pressure and specific gravity in each of the fluid lines entering and exiting filter stack 10. In particular, the concentrate flow rate and specific gravity in line 48 is monitored by sensor 49 to ensure a concentrate specific gravity within the range of about 2.0 to about 2.3 depending upon the type of titanium dioxide being processed. When processing a slurry containing the rutile form of titanium dioxide, the specific gravity should be between about 2.0 and about 2.2, more preferably between about 2.14 and about 2.2. When processing a slurry containing the anatase form of titanium dioxide, the specific gravity should be between about 2.0 and about 2.3, more preferably between about 2.1 and about 2.3. Sensors 35 and 41 monitor permeate fluid pressure and feed line pressure. If permeate fluid pressure exceeds 124 kPa (18 psi) or feed line pressure exceeds 827 kPa (120 psi), then flow of the slurry of titanium dioxide to filter stack 10 is halted and the flushing process described below initiated.

During production of the first 200 tons, if the specific gravity of a slurry containing either the rutile or anatase form exceeds 2.2, the computer control system will signal the need for a flush of filter stack 10. However, if the specific gravity were to exceed 2.205 prior to initiating the flushing process, then the computer control system will shut down VSEP filtration system 5. Following production of approximately 200 tons of concentrate, sensor 49 will indicate the need for flushing of filter stack 10 when the upper limit of specific gravity for each form of titanium dioxide is exceeded. Preferably, following the production of 200 tons, the computer control system will signal the need for flushing when concentrate specific gravity of a rutile slurry exceeds 2.2 and will signal shut down of VSEP filtration system 5 if the specific gravity exceeds 2.3. When processing a slurry of anatase, the computer control system will signal the need for flushing when concentrate specific gravity of a rutile slurry exceeds 2.3 and will signal shut down of VSEP filtration system 5 if the specific gravity exceeds 2.4. Flushing the filter stack 10 will preclude or remove excess buildup of titanium dioxide on filter disks 12 and diverter trays 14. Excessive $TiO_2$ build up on filter disks 12 and diverter trays 14 increases the risk of a failure of the membrane 28 and/or the likelihood of the slurry going dilatant.

The flushing process requires stoppage of the slurry feed through line 40 into filter stack 10 by closing valve 64. As feed from the tank 38 is halted, fluid from permeate holding tank 46 flows through line 61 into filter stack 10. As previously indicated, permeate fluid typically has a specific gravity of about 1.0 to about 1.1. As such, permeate fluid is preferably free of titanium dioxide particles and is capable of removing excess particles from within filter stack 10. Flushing with low specific gravity permeate fluid will also remove most blockages resulting from a dilatant slurry. Flushing of filter stack 10 continues until the specific gravity of the concentrate exiting filter stack 10 is between about 1.0 and about 1.2. The flushing step lasts at least 100 seconds for filter stacks 10 having a thirty-six inch height. Preferably, the flushing step lasts 200 seconds and more preferably the flushing step is at least about 300 seconds. Following lowering of the specific gravity of the fluid in concentrate line 48 to the range of about 1.0 to about 1.2, the slurry of titanium dioxide from feed tank 38 is once again allowed to flow to filter stack 10.

In addition to monitoring the concentrate exiting filter stack 10, the TMP is also monitored by comparing data from sensors 35 and 49 to maintain operations within desired specification ranges. As noted above, a TMP of at least about 207 kPa (30 psig) is preferred. A TMP less than about 207 kPa (30 psig) will allow membrane 28 to lift away from filter membrane support 32 increasing the likelihood of damage to membrane 28. Preferably, the computer controlled system will initiate the above-described flushing process whenever a TMP of about 241 kPa (35 psig) or less is indicated.

The method of the current invention also monitors the load experienced by motor 9. On start-up, the load experienced by motor 9 is considered to be the baseline load. During operation of VSEP filtration system 5, the load on motor 9 will gradually increase. Accordingly, the baseline load is reset on a regular basis. Preferably, the baseline load is reset on a monthly basis. Sudden increases in motor load are one indication of a blockage in filter stack 10. The blockage may either be a result of slurry dilatancy or loss of a diverter plate 22. In the preferred embodiment, an increase in motor load greater than 50% of the baseline load will signal the need to flush filter stack 10 in the manner described above. Preferably, the motor 9 used to oscillate the filter stack 10 is an electric motor 9.

An alternative flushing method is also provided by the current invention. If the above method of flushing filter stack 10 does not succeed in restoring filter stack 10 to production levels, then the alternative flushing method provides for backflushing of filter stack 10. In this method, VSEP filtration system 5 is shut down. Preferably, backflushing through concentrate port 20 takes place first, followed by flushing through feed port 18. In this manner, the current invention will clear blockage resulting from dilatant build up of titanium dioxide within filter stack 10.

Finally, in order to obtain the maximum usage from each filter stack 10, the method of the current invention also provides for the sacrifice of the lowest diverter trays 14 in filter stack 10. In this embodiment of the current invention, if the standard flush and backflush methods do not restore production levels of flow through filter stack 10, then filter stack 10 is removed from VSEP filtration system 5 and the lower diverter plates 22 are removed from diverter trays 14. Preferably, the selected diverter plates 22 are drilled out in a manner which does not otherwise damage diverter trays 14. Following removal of diverter plates 22, diverter trays 14 have a configuration identical to filter disks 12. As noted above, a typical arrangement of filter disks 12 and diverter trays 14 in filter stack 10 provides a greater number of diverter trays 14 at the lower portion of filter stack 10.

In general, membrane 28 and diverter plates 22 on lower diverter trays 14 and filter disks 12 tend to fail or the slurry tends to go dilatant in these portions of filter stack 10 prior to the upper diverter trays 14. In the preferred embodiment of the current invention, conversion of about the lower thirty percent of diverter trays 14 to filter disks 12 will permit continued usage of filter stack 10 at about normal capacity flow rates. Production rates following such conversions are equal to or greater than production rates just prior to shut down of filter stack 10 for removal of diverter plates 22. A typical production rate for a filter stack following conversion of the lower 25% to 40% of diverter trays 14 to filter disks 12 is about the same as the production rate following processing of about 200 tons of concentrate.

Removal of the lower diverter plates 22 increases the overall life of filter stack 10, by approximately the same number of weeks following the conversion, as had elapsed prior to the conversion. Thus, when used in conjunction with improved filter stack 10, the current invention's method for monitoring and maintaining the VSEP filtration system 5 will, in most cases, effectively double the life of filter stack 10.

4. Method for Preparing and Transporting a Slurry of $TiO_2$

The present invention further provides a method for concentrating a slurry of $TiO_2$ and transporting the concentrate to a finishing facility. In this embodiment of the current invention, a slurry of anatase $TiO_2$ having a specific gravity ranging from about 1.2 to about 1.8 is concentrated to a specific gravity ranging from about 2.0 to about 2.3. When the slurry contains the rutile form of $TiO_2$, the upper limit of the specific gravity is about 2.2. In general, the preferred specific gravity for the concentrated slurry of $TiO_2$ is about 2.18.

The initial slurry is obtained from a conventional titanium dioxide process such as the sulfate or chloride process. A typical slurry will have a specific gravity between about 1.4 and about 1.53. While slurries of this nature may be refined into finished products, transportation costs to the finishing plants are prohibitive when methods other than pipelines are used. Therefore, increasing the quantity of $TiO_2$ in the slurry is desirable in order to reduce the volume of material to be shipped.

In the method of the current invention, a slurry containing $TiO_2$ is directed into feed tank 38. Slurry from feed tank 38 subsequently passes through line 40 to filter stack 10. Filter stack 10 is prepared for dewatering of the slurry and controlled in accordance with the methods described above. The flow rate of slurry from feed tank 38 to filter stack 10 is controlled by valve 64. Sensor 41 in line 64 monitors the flow rate and fluid pressure of the slurry in line 64. As the slurry passes through filter stack 10, water is removed from the slurry by means of filter disks 12 and diverter trays 14. The water removed from the slurry exits filter stack 10 through permeate port 16 which is in fluid communication with line 34. Line 34 carries the permeate fluid to permeate holding tank 46. The permeate fluid is substantially free of $TiO_2$. Preferably, the specific gravity of the permeate fluid is from 1.0 to about 1.1.

The concentrate exits filter stack 10 through concentrate port 20, which is in fluid communication with line 48. Line 48 includes variable control valve 58 and sensor 49. Sensor 49 monitors the specific gravity, fluid pressure and fluid flow rate. If sensor 49 indicates a specific gravity lower than the preferred range, then the operator or computer control system will open valve 54 in line 56 and close valve 50 in line 66. The low specific gravity fluid will then flow through line 56 back to feed tank 38 for further dewatering by filter stack 10. When sensor 49 indicates a specific gravity in the desired range, the operator or computer control system will close valve 54 and open valve 50 permitting flow of slurry through line 66 to concentrate holding tank 52.

The final slurry in concentrate holding tank 52 is subsequently loaded into railroad tank cars, tanker wagons or any other suitable transportation tank (not shown) for transport to a finishing plant. Typically, the finishing plant is a titanium dioxide finishing plant. Concentrate advantageously contains a greater quantity of $TiO_2$ by volume than previously possible by prior concentrating techniques. Preferably, one railroad tank car containing slurry produced by VSEP filtration system 5 carries an amount of $TiO_2$ equivalent to three or four tank cars of slurry prepared by other slurry concentrating methods.

On arrival at the finishing plant, the slurry is off loaded from the rail car or tanker wagon into storage tanks or directly into the finishing process. Finishing processes commonly requiring a slurry of titanium dioxide include but are not limited to: surface treatment with metal oxides and addition of dispersant and preservatives (biocides and fungicides) for preparation of commercial grade slurry for paper filler and coating applications.

The present invention has been described in detail with reference to FIGS. 1-4; however, other embodiments of the system and methods for performing the current invention will be apparent to those skilled in the art. For example, other arrangements of valves, fluid feed line, sensors and tanks will be appropriate for carrying out the current invention. Thus, the foregoing specification is considered exemplary with the true scope and spirit of the invention being indicated by the following claims.

We claim:

1. A method for dewatering a slurry of titanium dioxide having an initial specific gravity of from about 1.01 to about 1.8 using a filtration system comprising a filter stack, a means for oscillating said filter stack, a feed tank, a permeate holding tank, a concentrate removal line and a water source, said filter stack comprising filter disks and diverter trays, wherein the method comprises the steps of:

initially removing a sufficient quantity of said slurry having a specific gravity of from about 1.2 to about 1.8 from said feed tank such that addition of water or permeate to the remaining slurry in said feed tank will yield a slurry having a specific gravity ranging from about 1.01 to about 1.1;

passing permeate fluid from said permeate holding tank through said filter stack for period of time ranging from about 20 minutes to about 16 hours;

initiating fluid flow from said feed tank while directing concentrate flow from said filter stack to said feed tank;

increasing the specific gravity of the slurry in said feed tank at a rate of about 0.1 per hour to a range of about 1.4 to about 1.8, wherein following the increase in specific gravity of said slurry entering said filter stack, said concentrate removed from said filter stack has a specific gravity ranging from about 2.0 to about 2.3 and said permeate removed from said filter stack has a specific gravity ranging from about 1.0 to about 1.1;

adjusting fluid pressure of fluid entering said filter stack to a pressure between about 275 kPa and about 830 kPa;

initiating oscillation of said filter stack; and, subsequently setting the oscillation amplitude of said filter stack to a distance between about 0.6 cm and about 3.8 cm.

2. The method of claim 1, wherein the slurry added to said feed tank has a specific gravity of from about 1.4 to about 1.53.

3. The method of claim 1, wherein said filter stack is initially oscillated at an amplitude between about 0.32 cm and about 1.3 cm.

4. The method of claim 3, wherein said filter stack is initially oscillated for a period of time ranging from about 30 to about 120 minutes at the first amplitude setting and is subsequently oscillated for a period of time of about 4 hours at a second amplitude setting.

5. The method of claim 3, wherein the final oscillation amplitude is maintained between about 1.9 cm and about 2.2 cm.

6. The method of claim 1, wherein the permeate fluid passes through said filter stack for a period of time ranging from about 1 to about 2 hours.

7. The method of claim 1, wherein the permeate fluid stream exits the filter stack at a fluid pressure of about 34 kPa to about 172 kPa.

8. The method of claim 1, wherein the permeate fluid stream exits the filter stack at a fluid pressure of about 82 kPa to about 110 kPa.

9. The method of claim 1, further comprising the steps of:
monitoring concentrate flow rate and specific gravity;
stopping the flow of slurry from said feed tank following detection of a concentrate specific gravity of greater than about 2.3 when processing a slurry containing the anatase form of titanium dioxide and greater than 2.2 when processing a slurry containing the rutile form of titanium dioxide;
flushing said filter stack;
restoring slurry flow from said feed tank; and,
continuing to monitor concentrate flow rate and specific gravity.

10. The method of claim 9, wherein said step of flushing said filter stack is achieved by replacing the slurry flow from said feed tank with permeate flow obtained from said permeate holding tank.

11. The method of claim 9, wherein said filter stack is flushed for a period of time of at least 100 seconds.

12. The method of claim 9, wherein said filter stack is flushed for a period of time of at least 200 seconds.

13. The method of claim 9, wherein said filter stack is flushed for a period of time of at least 300 seconds.

14. The method of claim 9, wherein the step of flushing takes place for a period of time sufficient to lower the concentrate specific gravity to a range of about 1.0 to about 1.2.

15. A method for dewatering a slurry of titanium dioxide having an initial specific gravity of about 1.01 or greater using a filtration system comprising a filter stack, a means for oscillating said filter stack, a feed tank, a permeate holding tank, a concentrate removal line and a water source wherein the method comprises the steps of:

removing slurry from said feed tank;

when said slurry in said feed tank initially has a specific gravity of about 1.2 or greater, adding sufficient water or permeate to said feed tank to reduce the specific gravity of the slurry stored in said feed tank to a range of about 1.01 to about 1.1;

passing permeate fluid from said permeate holding tank through said filter stack for period of time ranging from about 20 minutes to about 16 hours;

initiating fluid flow from said feed tank while directing concentrate flow from said filter stack to said feed tank;

adding slurry to said feed tank thereby increasing the specific gravity of the slurry in said feed tank to a range of about 1.2 to about 1.8 whereby the rate of increase of the specific gravity of the slurry in said feed tank is about 0.1 per hour;

initiating oscillation of said filter stack;

increasing the oscillation amplitude of said filter stack;

setting the oscillation amplitude of said filter stack to a distance between about 0.6 cm and about 3.8 cm;

increasing the specific gravity of the slurry in said feed tank; and, removing concentrate and permeate from said filter stack, said concentrate removed from said filter stack has a specific gravity ranging from about 2.0 to about 2.3 and said permeate removed from said filter stack has a specific gravity ranging from about 1.0 to about 1.

16. The method of claim 15, further comprising the steps of:
monitoring concentrate flow rate and specific gravity;
stopping the flow of slurry from said feed tank following detection of a concentrate specific gravity of greater than about 2.3 when processing a slurry containing the anatase form of titanium dioxide and greater than about 2.2 when processing a slurry containing the rutile form of titanium dioxide;
flushing said filter stack; and,
restoring slurry flow from said feed tank while continuing to monitor concentrate flow rate and specific gravity.

17. The method of claim 15, wherein the slurry added to said feed tank has a specific gravity of from about 1.4 to about 1.53.

18. The method of claim 15, wherein said filter stack is initially oscillated at an amplitude between about 0.32 cm and about 1.3 cm.

19. The method of claim 18, wherein said filter stack is initially oscillated for a period of time ranging from about 30 to about 120 minutes at the first amplitude setting and is subsequently oscillated for a period of time of about 4 hours at a second amplitude setting.

20. The method of claim 18, wherein the final amplitude is between about 1.9 cm and about 2.2 cm.

21. The method of claim 15, wherein the permeate fluid passes through said filter stack for a period of time ranging from about 1 to about 2 hours.

22. The method of claim 16, wherein said step of flushing said filter stack is achieved by replacing the slurry flow from said feed tank with permeate flow obtained from said permeate holding tank.

23. The method of claim 16, wherein the step of flushing said filter stack takes place for a period of time of at least 100 seconds.

24. The method of claim 16, wherein the step of flushing said filter stack takes place for a period of time of at least 200 seconds.

25. The method of claim 16, wherein the step of flushing said filter stack takes place for a period of time of at least 300 seconds.

26. The method of claim 16, wherein the step of flushing said filter stack takes place for a period of time sufficient to lower the concentrate specific gravity to a range of about 1.0 to about 1.2.

27. A method for dewatering a slurry of titanium dioxide having an initial specific gravity of from about 1.01 to about 1.8 using a filtration system comprising a filter stack, a means for oscillating said filter stack, a feed tank containing a slurry, a permeate holding tank, a concentrate removal line and a water source wherein the method comprises the steps of:

when said slurry in said feed tank initially has a specific gravity of about 1.2 or greater, lowering the specific gravity of said slurry stored in said feed tank to a range of about 1.0 to about 1.1;

passing permeate fluid from said permeate holding tank through said filter stack for period of time ranging from about 20 minutes to about 16 hours, said permeate fluid having a specific gravity between about 1.0 and about 1.1;

initiating fluid flow from said feed tank while directing concentrate flow from said filter stack to said feed tank;

adding slurry having a specific gravity of from about 1.2 to about 1.8 to said feed tank;

initiating oscillation of said filter stack at an amplitude between about 0.32 cm and about 0.6 cm;

increasing oscillation of said filter stack to an amplitude between about 0.6 cm and about 1.3 cm;

subsequently setting the oscillation of said filter stack to an amplitude between about 0.6 cm and about 3.8 cm;

increasing the specific gravity of the slurry in said feed tank to a range of about 1.2 to about 1.8;

removing concentrate and permeate from said filter stack, said concentrating having a specific gravity ranging from about 2.0 to about 2.2 when processing a slurry containing the rutile form of titanium dioxide, said concentrate having a specific gravity ranging from about 2.0 to about 2.3 when processing a slurry containing the anatase form of titanium dioxide and said permeate having a specific gravity ranging from about 1.0 to about 1.1;

monitoring concentrate flow rate and specific gravity;

flushing said filter stack by replacing the slurry flow from said feed tank with permeate flow obtained from said permeate holding tank for a period of time sufficient to lower the concentrate specific gravity to a range of about 1.0 to about 1.2 upon detection of a concentrate specific gravity of greater than 2.2 when processing a slurry containing the rutile form of titanium dioxide and greater than 2.3 when processing a slurry containing the anatase form of titanium dioxide; and, restoring slurry flow from said feed tank while continuing to monitor concentrate flow rate and specific gravity.

28. The method of claim 27, wherein the permeate fluid passes through said filter stack for a period of time ranging from about 1 to about 2 hours.

29. The method of claim 27, wherein said filter stack is initially oscillated at an amplitude of about 0.32 cm to about 0.6 cm for about 30 to about 120 minutes.

30. The method of claim 27, wherein the step of oscillating said filter stack at an amplitude between about 0.6 cm and about 1.3 cm is maintained for about 4 hours.

31. The method of claim 27, wherein the final oscillation amplitude is maintained between about 1.9 cm and about 2.2 cm.

32. The method of claim 27, wherein the step of increasing the specific gravity of the slurry in said feed tank to a range of about 1.1 to about 1.8 occurs over a period of time at a rate of increase of about 0.10 per hour.

33. The method of claim 27, wherein the step of flushing lasts for a period of time of at least 100 seconds.

34. The method of claim 27, wherein the step of flushing lasts for a period of time of at least 200 seconds.

35. The method of claim 27, wherein the step of flushing lasts for a period of time of at least 300 seconds.

* * * * *